(12) United States Patent
Linke et al.

(10) Patent No.: US 10,406,740 B2
(45) Date of Patent: Sep. 10, 2019

(54) ARRANGEMENT FOR FEEDING CONTENTS INTO A CONTAINER BEING FORMED FROM A PREFORM, IN A MACHINE FOR SIMULTANEOUSLY MOULDING AND FILLING CONTAINERS MADE FROM PREFORMS

(71) Applicant: KHS Corpoplast GmbH, Hamburg (DE)

(72) Inventors: Michael Linke, Hamburg (DE); Rolf Baumgarte, Ahrensburg (DE); Michael Litzenberg, Börnsen (DE); Gerhard Klöpper, Hamburg (DE); Niels Meyer, Schenefeld (DE)

(73) Assignee: KHS Corpoplast GmbH, Hamburg (DE)

(*) Notice: Subject to any disclaimer, the term of this patent is extended or adjusted under 35 U.S.C. 154(b) by 275 days.

(21) Appl. No.: 15/517,320

(22) PCT Filed: Oct. 16, 2015

(86) PCT No.: PCT/EP2015/002048
§ 371 (c)(1),
(2) Date: May 31, 2017

(87) PCT Pub. No.: WO2016/058700
PCT Pub. Date: Apr. 21, 2016

(65) Prior Publication Data
US 2017/0259487 A1 Sep. 14, 2017

(30) Foreign Application Priority Data
Oct. 16, 2014 (DE) .................. 10 2014 015 201

(51) Int. Cl.
*B29C 49/46* (2006.01)
*B29C 49/58* (2006.01)
(Continued)

(52) U.S. Cl.
CPC .............. *B29C 49/58* (2013.01); *B29C 49/06* (2013.01); *B29C 49/12* (2013.01); *B29C 49/46* (2013.01);
(Continued)

(58) Field of Classification Search
CPC .............. B29C 49/46; B29C 2049/465; B29C 2049/4664; B29C 49/58; B29C 2049/5803
See application file for complete search history.

(56) References Cited

U.S. PATENT DOCUMENTS

| 2011/0135778 A1 | 6/2011 | Andison et al. |
| 2013/0106027 A1 | 5/2013 | Maki et al. |

(Continued)

FOREIGN PATENT DOCUMENTS

| DE | 4012849 A1 | 10/1991 |
| DE | 202007014205 U1 | 9/2008 |

(Continued)

*Primary Examiner* — Robert B Davis
(74) *Attorney, Agent, or Firm* — Rankin, Hill & Clark LLP

(57) ABSTRACT

The invention relates to an arrangement 1 for feeding contents into a container being formed from a preform 2 in a mold 3, in a machine for simultaneously molding and filling containers made from preforms, wherein the arrangement defines, by the way of its wall 7, a flow path between a contents-supply line 4 and the mouth opening 6 of the container. The arrangement 1 is characterized in that it has a sealing termination both in relation to the contents-supply line 4 and in relation to the preform 2.

20 Claims, 12 Drawing Sheets

(51) Int. Cl.
*B29C 49/06* (2006.01)
*B29C 49/12* (2006.01)

(52) U.S. Cl.
CPC .............................. *B29C 2049/465* (2013.01); *B29C 2049/4664* (2013.01); *B29C 2049/5803* (2013.01)

(56) References Cited

U.S. PATENT DOCUMENTS

2014/0367895 A1* 12/2014 Sato ................. B29C 49/12
264/532
2015/0298828 A1 10/2015 Klatt et al.

FOREIGN PATENT DOCUMENTS

| | | | | |
|---|---|---|---|---|
| DE | 102008030866 A1 | 12/2009 | | |
| DE | 102010007541 A1 | 6/2011 | | |
| WO | 2005044540 A1 | 5/2005 | | |
| WO | 2010003853 A1 | 1/2010 | | |
| WO | WO-2013099108 A1 * | 7/2013 | ............. | B29C 49/12 |
| WO | WO-2014173870 A1 * | 10/2014 | ............. | B29C 49/58 |

\* cited by examiner

ARRANGEMENT FOR FEEDING CONTENTS INTO A CONTAINER BEING FORMED FROM A PREFORM, IN A MACHINE FOR SIMULTANEOUSLY MOULDING AND FILLING CONTAINERS MADE FROM PREFORMS

The present invention relates to an arrangement for feeding contents into a container being formed from a preform in a machine for simultaneously molding and filling containers made from preforms, wherein the arrangement defines a flow path between a contents line and the container mouth opening by its wall.

Containers, in particular bottles, have been traditionally formed in the blow form method by a forming gas flowing under pressure into a preheated preform and filled in a second step with contents, in particular with liquid contents. Methods have recently been developed for an economical production in which the preheated preform is not formed in one step by a pressurized gas but rather by the liquid contents fed under pressure in one step and which can be filled. Such a method is known, e.g., from DE 10 2010 007 541 A1.

In order that the preform can be shaped to a container, it consists of a thermoplastic material and is thermally conditioned, that is, in particular heated. At this time the body of the preform is heated, e.g., to approximately 120° C. and can be formed, while the mouth area should only reach clearly lower temperatures since the preform is held in the mouth area in the forming and filling machine and should not deform under the holding forces which are customary there.

The glass transition temperature of the customarily used thermoplastic materials above which the material can be deformed without fissures is approximately 70° C. This temperature may not be dropped below during the entire shaping. On account of the high thermal capacity of the liquids to be filled in comparison to the forming gases used during the blow forming, the preform rapidly loses temperature. During the filling of cold liquids such as, e.g., water, a processing time for the forming and filling procedure of approximately 300 ms is available.

It is therefore important to allow the liquid flowing in under pressure into the forming container to flow in with a high flow through rate. The container mouth opening is the narrowest area in this regard. A backup, which could result in high backup pressures, should be avoided.

In the case of high pressures there is also the danger of the deforming of the mouth opening area of the container. The temperature of the preform directly below the mouth opening area should be as clearly as possible above the glass transition temperature of the material used so that the container can be formed. As a result of the greater removal of heat by the liquid contents, in particular during cold filling, a significant temperature loss must be accepted during the shaping so that the initial temperature is to be set correspondingly high. The backup pressure can be temporarily distinctly higher than the filling pressure due to dynamic effects so that there is the risk of a deformation of the mouth opening area.

Usually, the cross-sectional area of the bottle mouth opening is also additionally limited by a stretching rod which dips around the axis of the preform into the preform and the forming container and supports the axial stretching. This creates an annular slot in the area of the mouth opening.

The liquid contents are fed from a storage tank under pressure through a feed line. A direct feeding to the container mouth opening is prevented by the stretching rod. In this case a deflection of the contents stream is additionally required, wherein turbulence or a backup should be prevented or their effects reduced.

The invention has the problem of suggesting an arrangement for the feeding of contents from a feed line into a container forming from a preform in a machine for simultaneously forming and filling containers from preforms which keeps the turbulence and backup pressure as low as possible or reduces their effects.

In order to solve the problem, an arrangement is suggested for feeding contents into a container forming in a mold from a preform in a machine for simultaneously forming and filling containers from preforms, wherein the arrangement defines a flow path between a contents line and the container mouth opening by its wall. The arrangement is characterized in that it comprises a sealing termination in relation to the contents line and also in relation to the preform. Customary, standardly used technology is used for the feeding of contents which must work with the required pressures but otherwise does not have to be further coordinated with the mold of the container to be formed and filled. The mold and the preform used are container-specific. The interface is the mouth opening of the preform. The arrangement of the invention defines the flow path between the contents line and the mouth opening of the preform and of the forming container and can be individually adapted.

The arrangement can achieve in particular a sealing termination with the mouth opening of the preform or between the arrangement and the outside of the preform, preferably in the lower mouth opening area or between the arrangement and the mold.

According to an advantageous embodiment of the invention the diameter of the arrangement can decrease in the direction of the container mouth opening between a first wall area substantially parallel to the axis of the preform and between a second wall area parallel to the axis of the preform and the transition between the feed line and the arrangement takes place tangentially to a wall of the arrangement and the transition between the wall of the arrangement and the container mouth opening takes place without edges and axially parallel to the axis of the preform.

This arrangement according to the invention makes possible the low-turbulence and low backup pressure deflection of a contents stream fed out of a feed line even under a high volume flow. The arrangement comprises an area with a rather large diameter and reduces its diameter basically like a funnel in the direction of the container mouth opening. The transition between the feed line and the arrangement should take place tangentially to an arrangement wall. As a result, the contents flow is gently deflected and no turbulences are created which could cause a backup.

As a result of the diameter which constantly reduces in the direction of the container mouth opening, the flow can place itself on the arrangement wall and the contents flow can continuously gain speed in the direction of the area with the smallest cross section in the area of the mouth opening.

The transition between the arrangement wall and the container mouth opening should take place without edges and axially parallel to the axis of the preform so that no turbulence occurs at the transition or that the flow comes off from the wall and reduces the effectively available cross section of the mouth opening.

The feed line can form an angle with the axis of the preform which is approximately at a right angle or also parallel or at another angle to it so that a substantially horizontal as well as an substantially vertical feed of the contents is possible.

The feed line is preferably slightly inclined downward in the case of an approximately vertically aligned preform so that the feed line, which is tangentially introduced into the feed arrangement brings about a flow which is directed slightly downward in the direction of the preform.

The cross-sectional area of the arrangement can be limited around the axis of the preform, in particular, it can be circular as results, e.g., from a stretching rod. As a result, an annular slot with an annular area is produced.

The diameter of the arrangement, which reduces in the direction of the container mouth opening, can become smaller in particular in a first concave curvature and in a second convex curvature in the direction of the container mouth opening, wherein concave and convex are to be understood as relative to the arrangement area which guides the flow.

The radii of curvature should be selected in particular in such a manner here that no edges are produced and therefore no flow stalls can occur.

The tangent to the flow-conducting wall can form at its flattest section an angle of below 60° to the axis of the preform and in particular of below 45° to the axis of the preform.

The radii of curvature of the curves can be greater according to an embodiment than one half the height of the arrangement and/or greater than one fourth of its reduction in diameter.

According to another embodiment of the invention the device wall can be superposed by a flow-conductive spiral contour.

According to an exemplary embodiment the arrangement can comprise a stretching rod with flow-conducting contours, in particular with a spiral contour or a helical contour. As a result, a circular flow can be supported in the area of the annular slot of the container mouth opening.

According to an embodiment the arrangement can rest in a sealing manner on the mouth opening of the preform or on the mouth opening of the container. Alternatively, the arrangement can terminate in a sealing manner outwardly even opposite a structural component of the machine, in particular opposite the mold, but also, however, opposite the holder of the preform or opposite any other suitable part. If no sealing termination takes place on the mouth opening, the mouth opening is washed from the outside and the inside by contents standing under pressure and no internal pressure is built up in the mouth opening area which can lead to a deformation of the mouth opening. Furthermore, the two-sided washing of the mouth opening can lead to a more rapid cooling down of this area, which should not be deformed, so that no unintended deformation, e.g. of a threading on the container mouth opening occurs.

According to a preferred device of the invention the arrangement can surround the container mouth opening at least partially and preferably entirely on the outside. It can preferably support the container mouth opening from the outside against radial forces. In the latter case a deformation of the mouth opening area by pressure forces acting from the inside can be prevented if the sealing between the arrangement and the container mouth opening takes place on the mouth opening itself. If the sealing takes place on the mold or on another structural component of the machine or on the outside of the mouth opening in the lower area of the mouth opening, a pressure compensation takes place between the outside and the inside of the mouth opening and no deformation by pressure forces takes place.

The container mouth openings are frequently provided with screw threadings. In this case the arrangement or a part of the arrangement can be screwed to the mouth opening. The shape of this part of the arrangement can then be constructed to be complementary to the threading and can reliably protect the threading against deformation. In order to simplify the construction of the shaping and filling station, the arrangement can be constructed at least in two parts in this case. The parts can then be connected to each other in a sealing manner. The part or parts that can be screwed onto the mouth opening can be connected by rotation with the mouth opening whereas the other part or parts can be connected in a non-rotating manner to the shaping and filling station.

The part or parts that can be screwed onto the mouth opening can advantageously form a seal like a cap with the upper edge of the mouth opening, for which an offset can be provided in these structural components which makes contact in the end position of the parts with the upper edge of the mouth opening. Independently of the type of seal, all structural components should advantageously be constructed in such a manner that projections or recesses should be avoided in all areas limiting the flow path in order to favor a laminar and low-turbulence flow of the contents.

In a method for the forming and filling of containers from preforms the part of the arrangement connected to the container mouth opening can also consist of a structural component which remains connected to the mouth opening during several process steps and a new part is used with each preform fed to the machine.

The invention is explained in detail in the following using the attached figures which show the following:

FIG. 1 schematically shows a first embodiment of an arrangement according to the invention for feeding contents in section;

FIG. 2 schematically shows another embodiment of an arrangement according to the invention for feeding contents in section;

It is obvious for a person skilled in the art that the drawings shown here should only serve for illustrating the principle of the invention and are reproduced only schematically and not true to scale. In particular, the relationships of size between the preform, formed container and the arrangement according to the invention only serve for illustration.

A person skilled in the art can freely determine the actual size relationships based on his professional knowledge.

Figure 1:
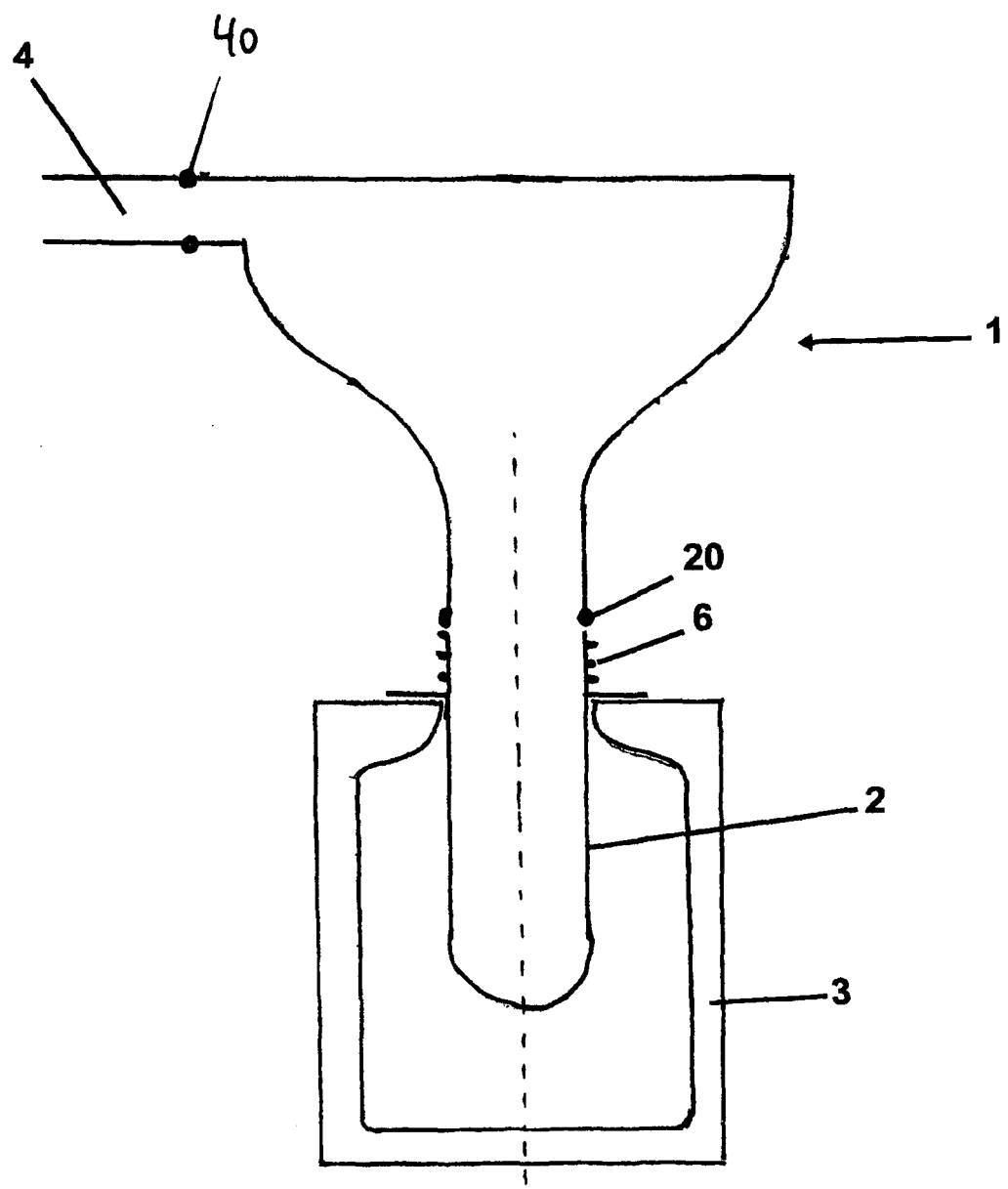

FIG. 1 schematically shows an exemplary embodiment of an arrangement 1 according to the invention for filling contents. A preform 2 can be seen which is introduced into a mold 3 of a forming and filling station of a filling machine. The preform 2 consists of a thermoplastic material and is thermally conditioned, i.e., it is heated to the extent that it can be plastically deformed. The forming should take place in a work step with the filling by contents flowing under pressure into the preform.

To this end contents are made available under high pressure from a feed line 4 and are introduced into the preform 2. The contents line 4 is made available on the machine side. However, the individual molds 3 and the individual preform differ from container to container. In order to make possible an easy adaptation to different containers an arrangement 1 for feeding contents is provided between the contents line 4 and the container mouth opening 6 with which an adaptation between the machine and the container mouth opening can be achieved and individually adapted to the flow conditions to be expected. The contents line 4 comprises to this end a sealing termination 40 to the arrangement 1 which can be connected again in a sealing manner here by seal 20 to the mouth opening 6 of the preform 3.

The diameter of the arrangement can diminish in the direction of the mouth opening of the preform, wherein the reduction can preferably take place in a funnel shape. This can take place by a customary funnel with straight walls, wherein edges are produced on the transition between the funnel cup and the straight walls. In order to avoid turbulence even in these areas, a funnel with gentle transitions, that is, with larger radii in the area of the transitions is selected in an especially preferred manner.

Figure 2:
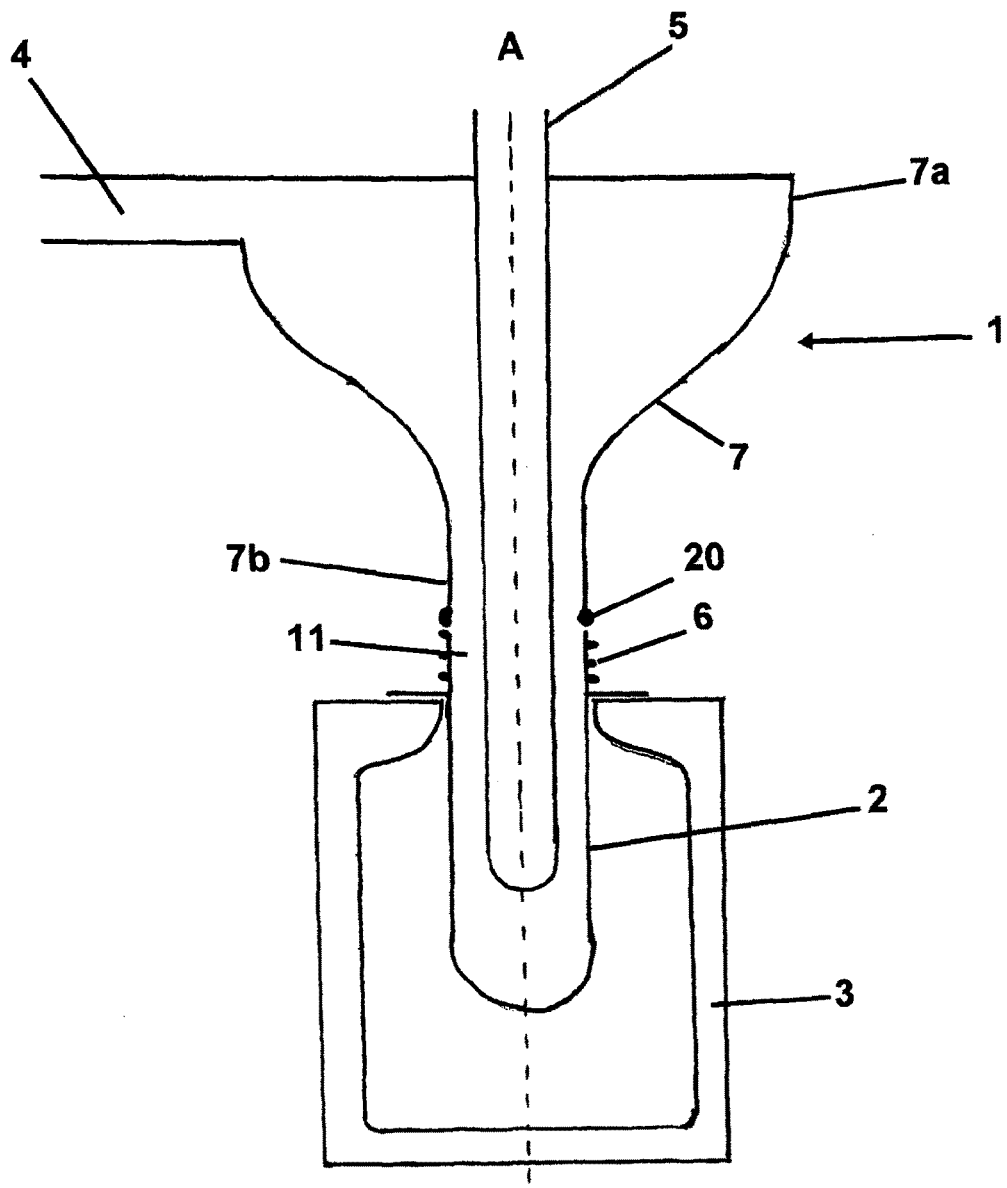

FIG. 2 schematically shows an exemplary embodiment of an arrangement 1 for feeding contents. A preform 2 can be seen which is introduced into a mold 3 of a forming and filling station of a filling machine. The preform 2 consists of a thermoplastic material and is thermally conditioned, i.e., it is heated until it can be plastically deformed. The forming should take place in a work step with the filling of contents flowing in under pressure into the preform.

To this end contents are provided under high pressure from a feed line 4 and introduced into the preform 2. For the forming of the container, here a bottle, from the preform 2, the latter must be stretched in the axial and the radial direction. In order to support the stretching in the axial direction a stretching rod 5 is provided centrally along the axis A of the preform 2. Therefore, the cross section 11 in the area of the bottle mouth opening 6 available for the feeding with contents is annular.

The contents flowing out of the feed line 4 cannot be directly fed in axial direction 4 of the preform 2 on account of the stretching rod 5 and must be diverted. This takes place with low turbulence and low backup pressure by means of the arrangement 1 according to the invention of which an exemplary embodiment is shown here.

The arrangement 1 defines a flow path with its wall 7, wherein the diameter of the arrangement constantly decreases in the direction of the container mouth opening 6 between a first area 7a substantially parallel to the axis of the preform and a second area 7b parallel to the axis of the preform. The area between them is basically funnel-shaped, wherein sharp edges and everything which could cause flow stalls was avoided.

The contents are fed approximately horizontally out of the contents feed line 4. At this time the transition between the feed line 4 and the arrangement 1 according to the invention should take place substantially tangentially in order to avoid turbulence.

The transition between the wall 7b of the arrangement and the container mouth opening 6 takes place without edges and axially parallel to the axis A of the preform. In this exemplary embodiment a seal 20 is provided between the arrangement and the container mouth opening 6.

Figure 3:
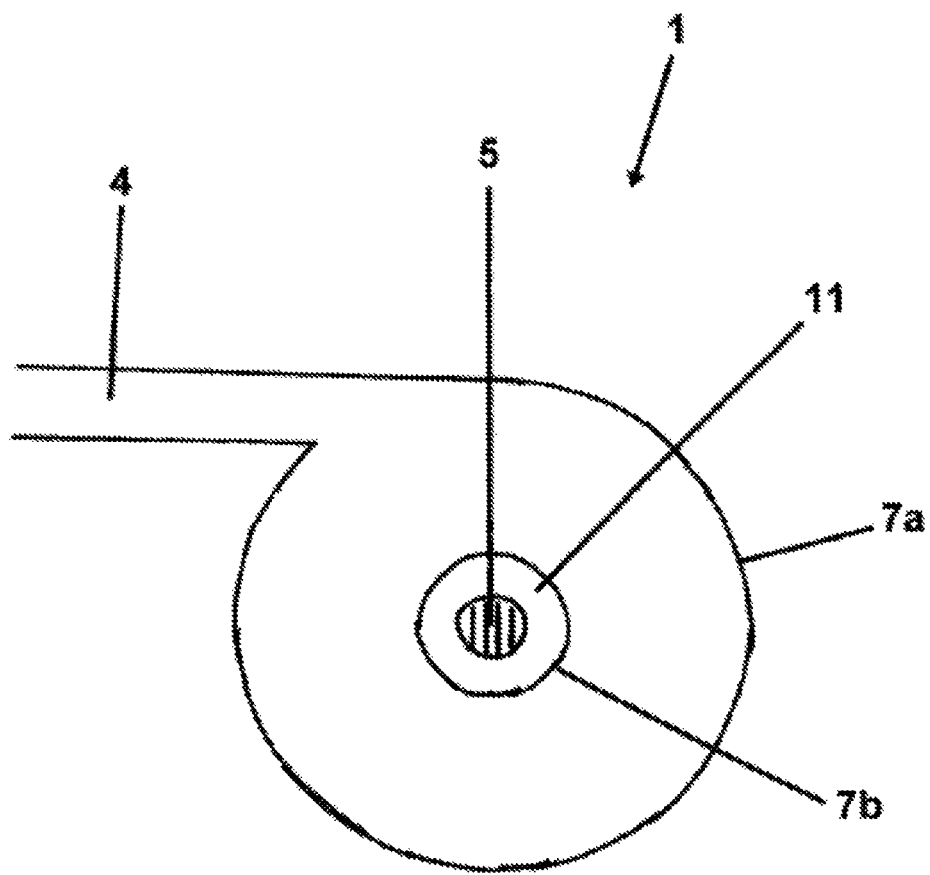
FIG. 3 shows the arrangement from FIG. 2 in a top view from above.

The arrangement shown in section in FIG. 2 is shown in a top view from above in FIG. 3. The contents feed 4 takes place substantially tangentially in the area of the wall 7a of the arrangement. The contents is conducted downward like a whirlpool in the direction of the annular slot 11 formed by the stretching rod 5 and the smaller diameter of the wall 7b of the arrangement and can flow with low turbulence and a low backup pressure into the preform and into the container forming from it.

The high volume flows that can be achieved with the arrangement according to the invention make it possible to maintain short processing times within which the thermally conditioned preform is warm enough to be deformed. As a result of the laminar flow which also develops in the preform and in the forming container and in which there is too little mixing between the flow layers, the container which is forming also cools down less rapidly than in the case of turbulent flows so that the processing time until the preform has reached its glass transition temperature and can no longer be formed is lengthened.

Figure 4:
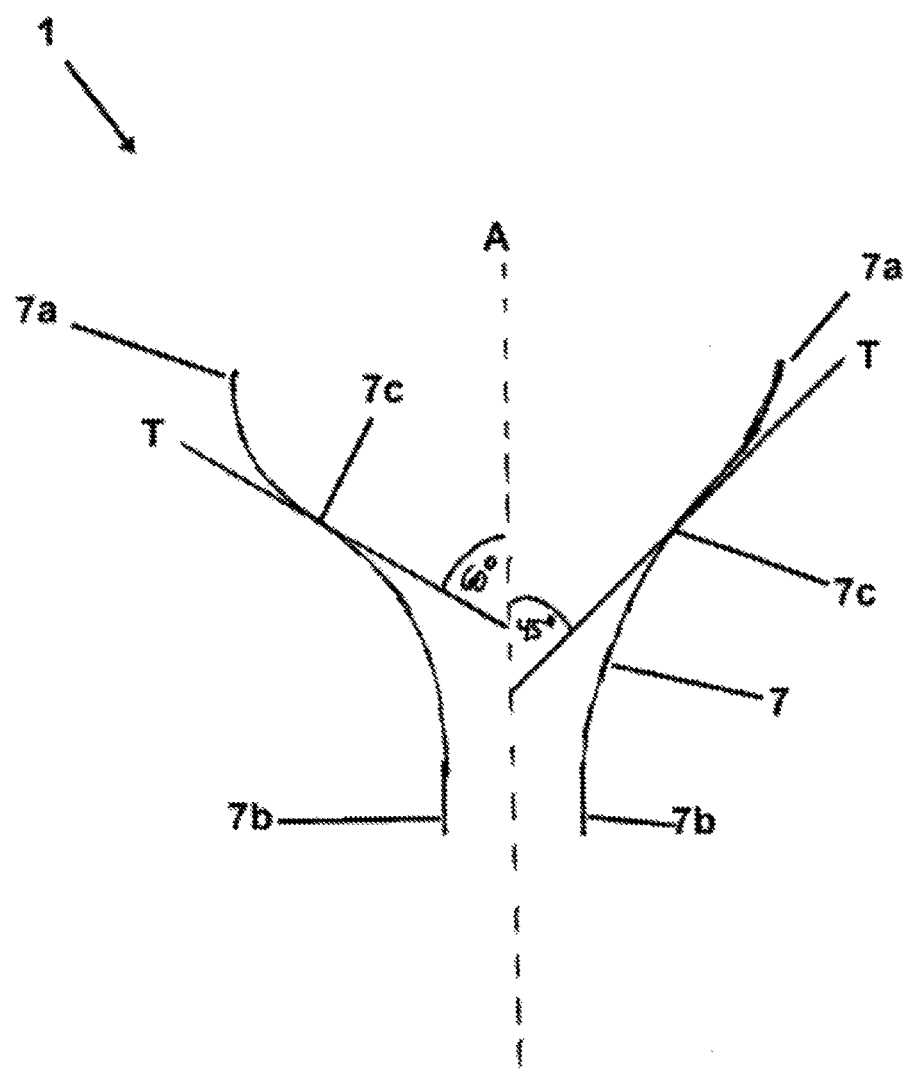
FIG. 4 shows to the right and the left of the plane of symmetry different exemplary embodiments of an arrangement according to the invention for feeding contents in section.

FIG. 4 schematically shows the preferable course of the wall 7 of two arrangements according to the invention as regards the axis A of the preform. The wall 7 of the arrangement runs starting from the first area 7a substantially parallel to the axis of the preform inward with a concave curvature, viewed from the flow-guiding area, which is followed by a convex curvature with which the wall merges into a second area 7b parallel to the axis of the preform. On the right and the left of the axis A different exemplary embodiments are shown in which the tangent T at the flattest position 7c, here at the transition between the concave and the convex curvature, forms an angle to the axis of the preform of 60° and 45°.

Figure 5:
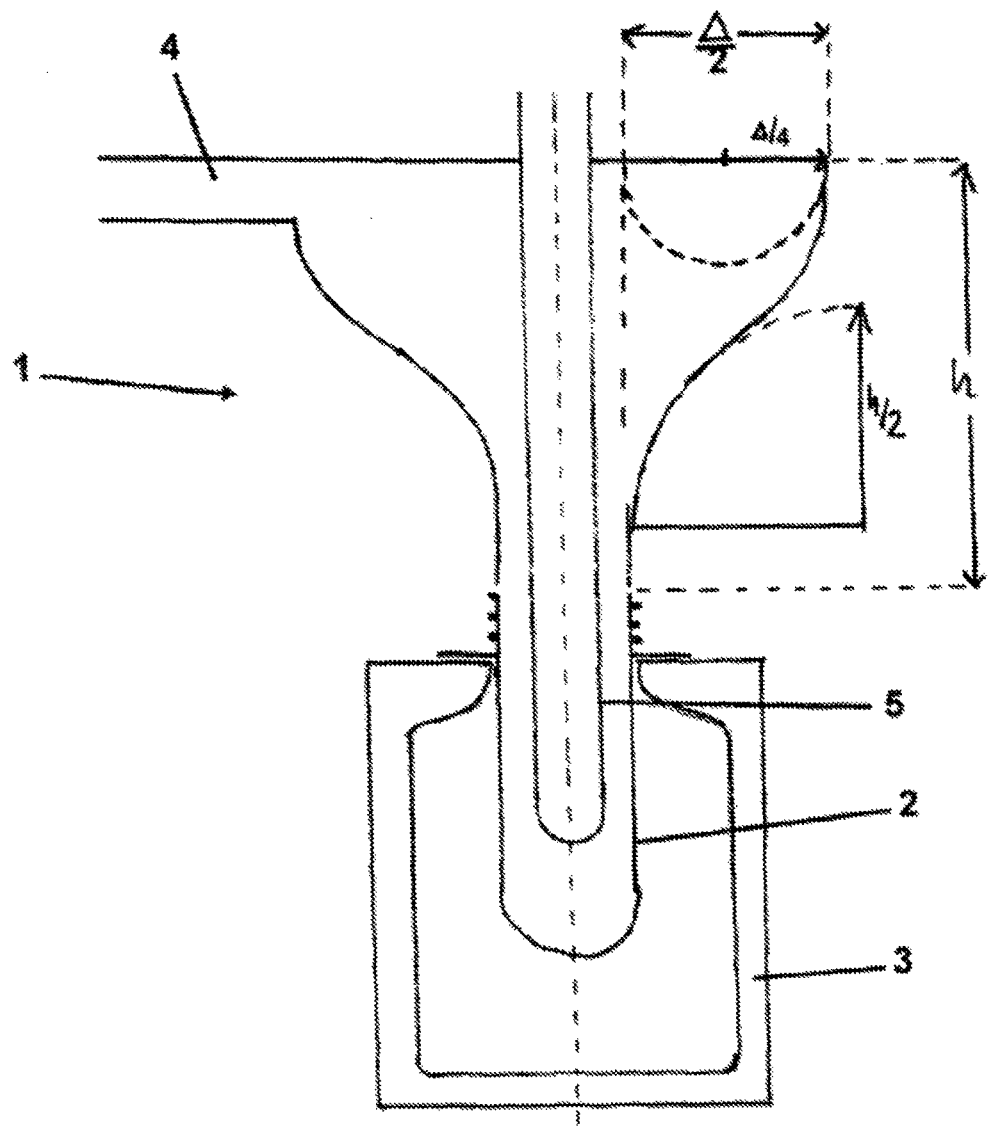
FIG. 5 shows another exemplary embodiment of an arrangement according to the invention for feeding contents in section.

FIG. 5 shows an arrangement according to the invention in section which has a height h and a reduction of diameter Δ. It is shown that the radii of curvature of the curvatures is greater than one half the height h of the arrangement or greater than one fourth of its reduction of diameter Δ.

Figure 6A:
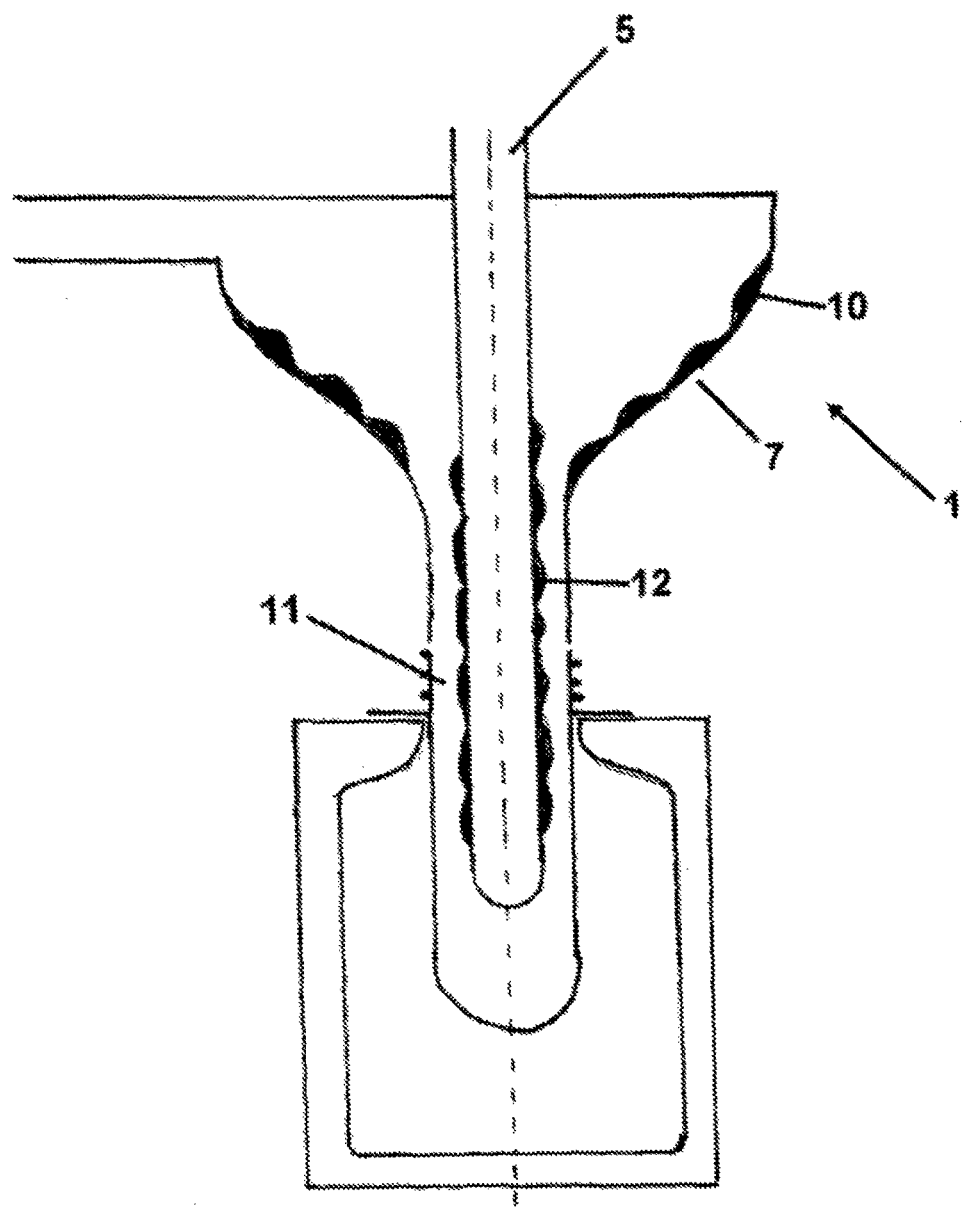
FIGS. 6a and 6b show yet another exemplary embodiment of an arrangement according to the invention in section and in a top view from above.
Figure 6B:
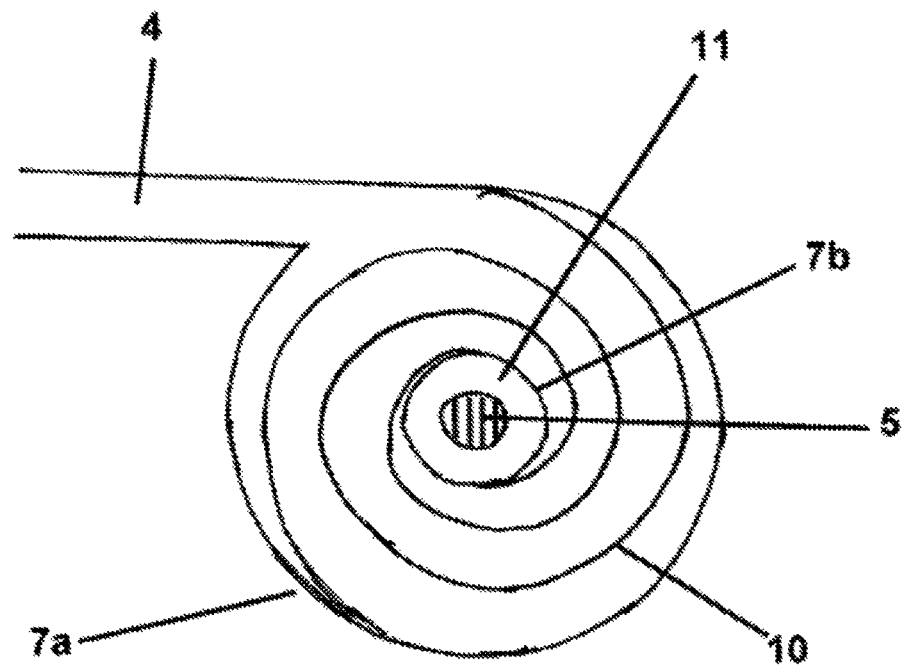

FIGS. 6a and 6b show another exemplary embodiment in which the wall 7 of the arrangement is superposed by a flow-conducting spiral contour 10. The contour supports the contents flow spirally downward in the sense of a whirlpool and facilitates high content flows in the area of the annular slot 11. The rotary movement of the contents flow can be additionally supported by an appropriately formed stretching rod 5, e.g., with coils 12, as is indicated in FIG. 5a.

Figure 7:
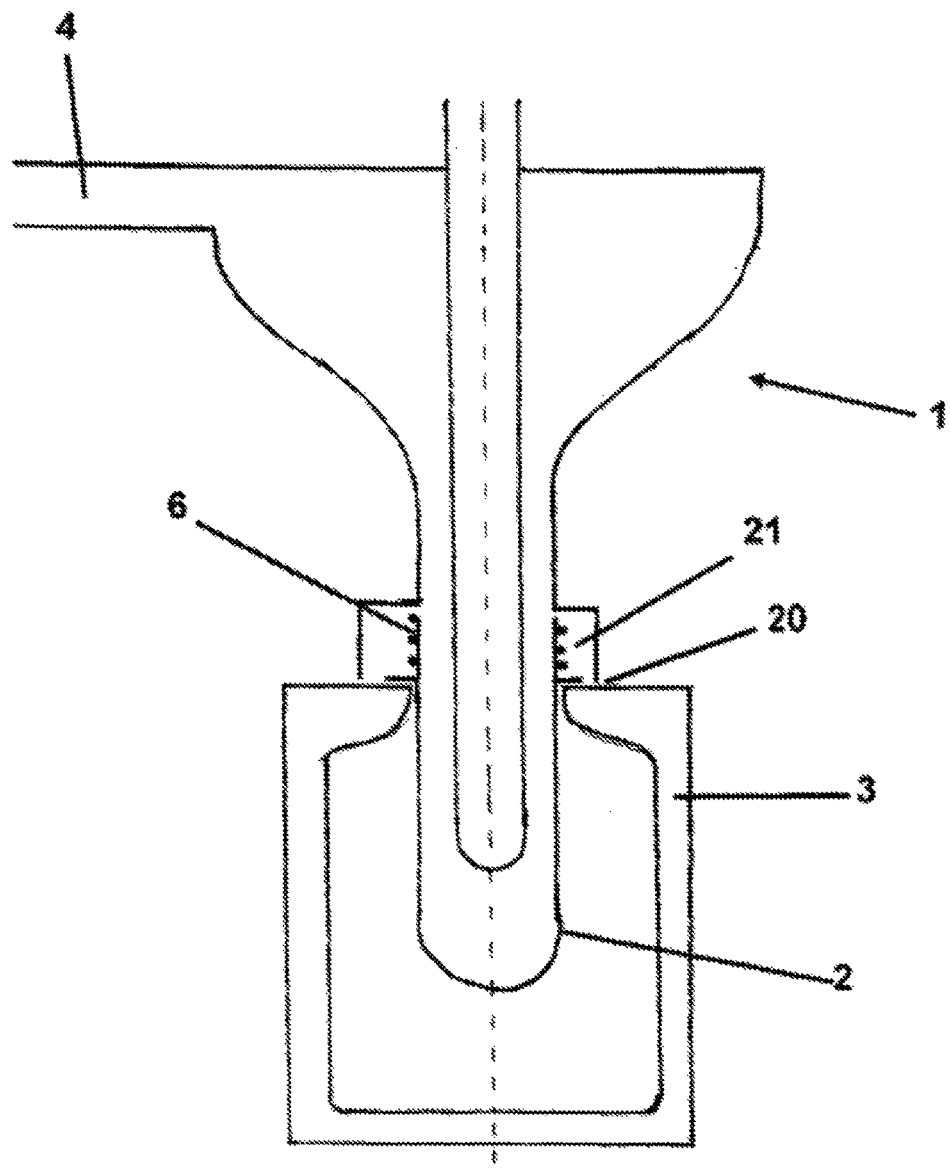
FIG. 7 shows an exemplary embodiment as in FIG. 2 but with another termination on the mouth opening of the preform.

FIG. 7 shows an exemplary embodiment of the arrangement 1 according to the invention which basically corresponds to the exemplary embodiment shown in FIG. 1. As a deviation from it, the seal 20 of the arrangement does not take place opposite the mouth opening 6 of the preform 2 as in FIG. 1 but rather opposite the mold 3. No seal is provided between the lower end of the arrangement and the mouth opening 6 of the preform 2 so that contents can flow into the area designated by 21 of the arrangement around the mouth opening 6. As a result, no force is built up on the mouth opening for the seal, nor is internal pressure built up in the area of the mouth opening 6 which could deform the mouth opening 6. As a result of the contents on the outer side 21 of the mouth opening, the same pressure is built up on all sides and the mouth opening 6 is not deformed, even if it is heated by the thermal conditioning of the preform 2.

Figure 8:
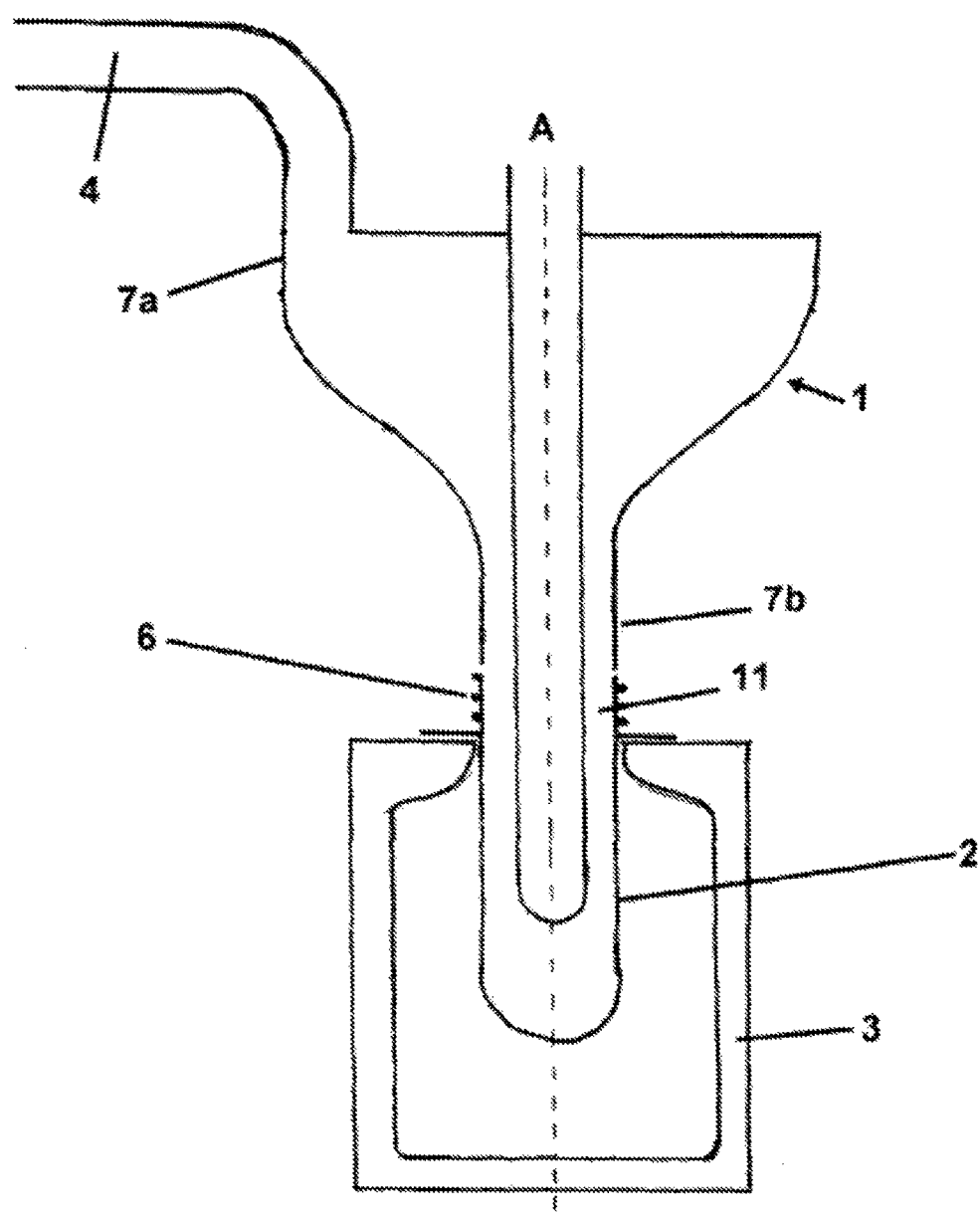
FIG. 8 shows an exemplary embodiment with a vertical feed of the contents.

FIG. 8 shows an arrangement in which the contents feed 4 takes place in a vertical direction. Again, the transition between the feed line 4 and the arrangement takes place tangentially to the wall 7a of the arrangement. The contents flow is gently deflected in order to flow with the least amount of turbulence through the annular slot 11.

Figure 9:
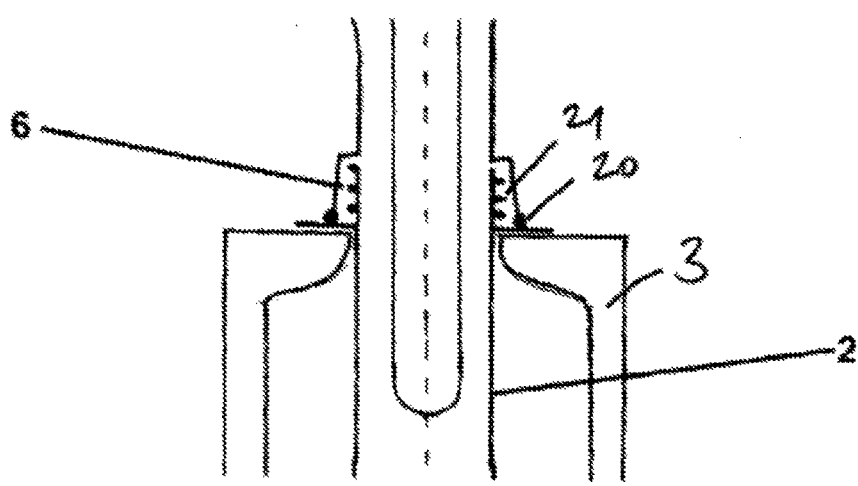
FIG. 9 shows an exemplary embodiment of a termination of the arrangement onto the mouth opening of the preform.

FIG. 9 shows in section an exemplary embodiment of a transition between an arrangement according to the invention similar to FIG. 7 and the mouth of the preform 6. As a deviation, the seal 20 of the arrangement does not take place opposite the mold 3 but rather opposite the outer area of the mouth opening 6 of the preform 2. No seal is provided between the lower end of the arrangement and the mouth opening 6 of the preform 2 so that contents can flow into the area, designated by 21, of the arrangement around the mouth opening 6. As a result, no force is applied on the mouth opening for sealing nor is an internal pressure built up in the area of the mouthpiece 6 which could deform the mouth opening 6. As a result of the contents on the outside 21 of the mouth opening, the same pressure is built up on all sides and the mouth opening 6 is not deformed, even if it is heated by the thermal conditioning of the preform 2.

Figure 10:
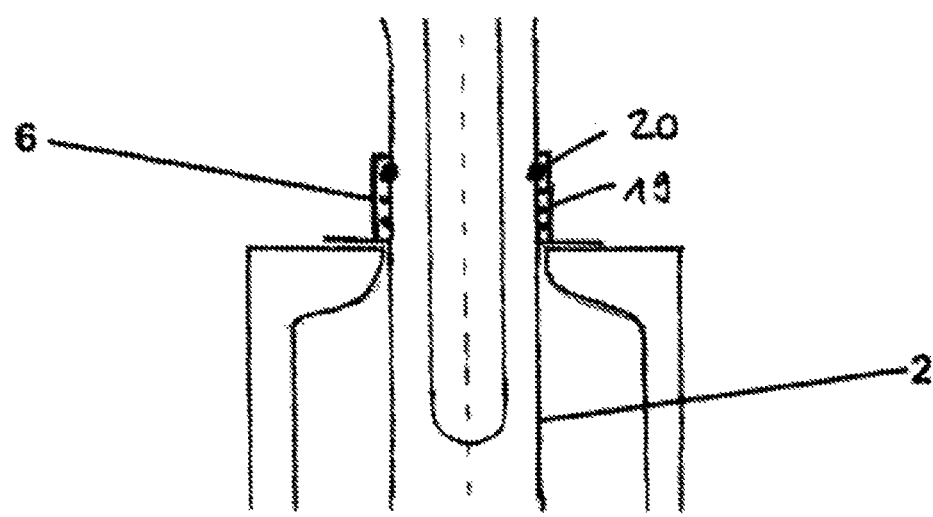
FIG. 10 shows another exemplary embodiment of a termination of the arrangement onto the mouth opening of the preform.

FIG. 10 shows a section of an exemplary embodiment of a transition between an arrangement according to the invention and the mouth opening of the preform 6, in which the arrangement surrounds the mouthpiece 6 of the preform 2 on the outside. The sealing between the arrangement and the preform 2 takes place by a seal 20 on the mouth opening. The area 19 of the arrangement surrounding the mouth opening 6 supports the mouth opening 6 outwardly against radially outwardly acting forces. If high pressures that could deform the mouth opening area 6 occur inside the mouth opening area 6 by the forming and filling of the container, these forces are compensated by the area 19 surrounding the mouth opening area 6 and the mouth opening is not deformed.

Figure 11:
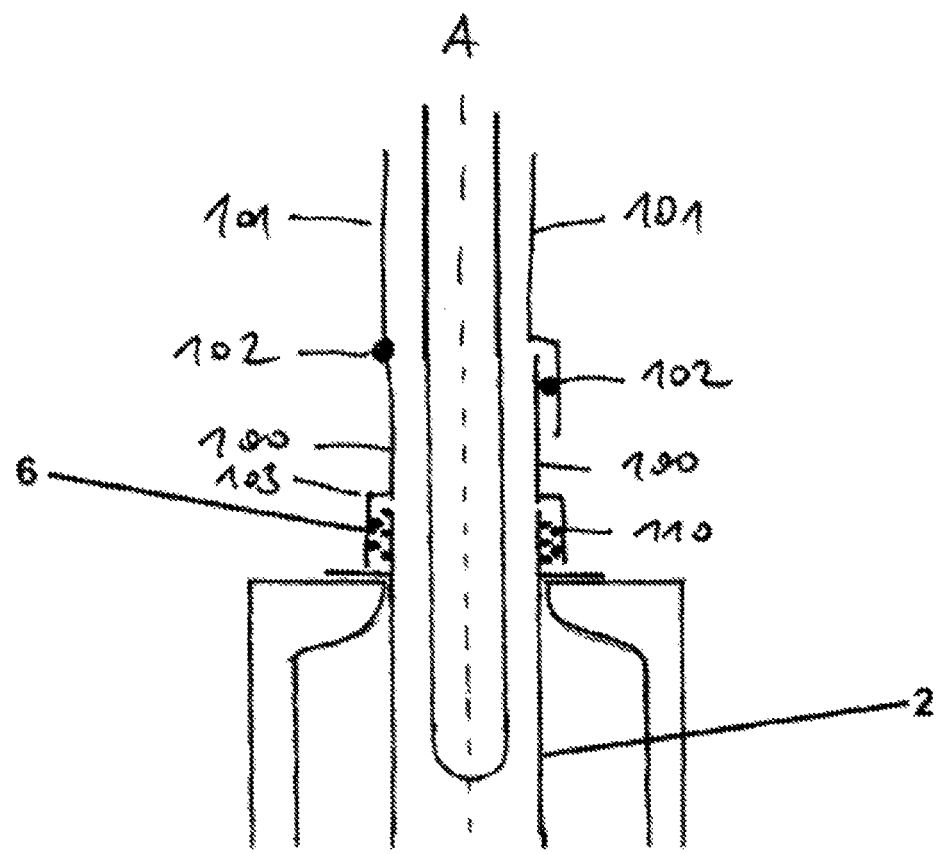
FIG. 11 shows an exemplary embodiment of a termination of the arrangement screwed onto the mouth opening of the preform.

In the exemplary embodiment shown in FIG. 11 the part 100 of the arrangement is screwed to the container mouth opening 6. To this end threads 110 are provided on the inside of the area of the part 100 surrounding the container mouth opening.

The part 100 which can be screwed onto the mouth opening seals like a cap with the upper edge of the mouth opening 6, for which a shoulder 103 is provided in this part 100 which comes in the end position of the part 100 in contact with the upper edge of the mouth opening 6. Edges and projections in the flow path are avoided by an appropriate shaping of the part 100 in order to favor a laminar and low-turbulence flow of the contents.

For the screwing to the mouth opening 6 the arrangement is provided in at least two parts so that in addition to the part 100, part 101 is also provided which is connected in a non-rotating manner to the machine and to the forming and filling station and which can be connected by seal 102 in a sealing manner to the part 100. Different possibilities of the sealing between the two parts 100 and 101 are shown to the right and the left of the axis of symmetry A in this figure. On the left the sealing takes place axially by the seal 102. However, it can also take place radially as shown on the right in the figure if the lower area of the part 101 can extend over the part 100. It is obvious for a person skilled in the art that the inverse solution, which is not shown here, is also possible, namely, that the lower area of the part 101 can be pushed into the part 100 or that the part 100 can extend from below over the part 101.

In this embodiment part 100 of the arrangement can also be connected, for example, in front of the forming and filling phase to the unfinished part. In the forming and filling phase the second part 101 is connected in a sealing manner to the first part 100 and the container is formed and filled. After the completed forming and filling, part 101 is separated again while part 100 still remains on the formed container. The area projecting over the mouth opening 6 then serves during the further transport of the filled container inside the filling machine as protection against overflowing so that high rotary speeds of the machine can be achieved without the contents being able to overflow out of the container.

The part 100 which can be screwed onto the mouth opening 6 can be reused. The machine can comprise such parts for this via a recycling which are then cleaned and/or sterilized preferably before being reused.

Part 100 can also be a disposable part which is either recycled after use or can remain on the container mouth opening and be used as a cap. To this end the part can be reshaped in particular by thermal shaping. The part is preferably cleaned and/or sterilized before use or before being set on the mouth opening of the preform.

The invention claimed is:

1. An arrangement for feeding contents into a container being formed in a mold from a preform having an axis by a machine configured to simultaneously form and fill containers made from preforms, said arrangement comprising:
   a conduit having an inner wall that defines a flow path between a contents line and a container mouth opening;
   a first sealing termination in relation to the contents line; and
   a second sealing termination in relation to the preform;
   wherein an inner diameter of the conduit becomes smaller in a direction toward the container mouth opening, and
   wherein the inner wall of the conduit includes a first portion having a concave curvature and a second portion having a convex curvature relative to the axis of the preform.

2. The arrangement according to claim 1, wherein the second sealing termination takes place between the arrangement and one of:
   the mouth opening of the preform;
   an outside of the preform; and
   the mold.

3. The arrangement according to claim 1, wherein the inner diameter of the conduit constantly decreases in the direction of the container mouth opening between a first wall area that is substantially parallel to the axis of the preform and between a second wall area that is also parallel to the axis of the preform, wherein a transition between the contents line and the arrangement takes place tangentially to the first wall area of the arrangement, and wherein a transition between the second wall area of the arrangement and the container mouth opening takes place without edges and is axially parallel to the axis of the preform.

4. The arrangement according to claim 1, wherein the contents line is approximately at a right angle to or approximately parallel to the axis of the preform or empties substantially horizontally, substantially vertically or inclined slightly downward into the arrangement.

5. The arrangement according to claim 1, wherein a cross-sectional area of the conduit is limited around the axis of the preform.

6. The arrangement according to claim 1, wherein the inner wall of the conduit has no edges.

7. The arrangement according to claim 1, wherein the axis of the preform and a line tangent to a flattest section of the inner wall of the conduit taken in a plane containing the axis of the preform define an angle of 60° or less.

8. The arrangement according to claim 1, wherein a radii of curvature of the inner wall of the conduit is greater than one half a height of the conduit and/or is greater than one fourth of a reduction in the diameter of the conduit.

9. The arrangement according to claim 1, wherein the inner wall is superposed by a flow-conductive spiral contour.

10. The arrangement according to claim 1, wherein the arrangement further comprises a stretching rod with a flow-conducting contour.

11. The arrangement according to claim 1, wherein the arrangement surrounds an outside of the mouth opening of the preform.

12. The arrangement according to claim 1, wherein the arrangement supports an outside of the container mouth opening of the preform against radial forces.

13. The arrangement according to claim 1, wherein the arrangement is configured to be screwed onto the container mouth opening.

14. The arrangement according to claim 1, wherein the arrangement is constructed of at least two parts, wherein one of the at least two parts is configured to be connected to the container mouth opening and wherein the at least two parts are configured to be connected to each other in a sealing manner.

15. The arrangement according to claim 14, wherein a part of the arrangement that is not connected to the container mouth opening is firmly connected to a forming and filling station of the machine.

16. The arrangement according to claim 2, wherein the second sealing termination takes place between the arrangement and the outside of the preform in a lower mouth opening area.

17. The arrangement according to claim 5, wherein the cross-sectional area of the arrangement around the axis of the preform is circular.

18. The arrangement according to claim 7, wherein the angle is 45° or less.

19. The arrangement according to claim 10, wherein the flow-conducting contour of the stretching rod a spiral flow-conducting contour or a helical flow-conducting contour.

20. The arrangement according to claim 1, wherein the conduit is in a form of a funnel.

* * * * *

UNITED STATES PATENT AND TRADEMARK OFFICE
CERTIFICATE OF CORRECTION

PATENT NO. : 10,406,740 B2
APPLICATION NO. : 15/517320
DATED : September 10, 2019
INVENTOR(S) : Michael Linke et al.

Page 1 of 1

It is certified that error appears in the above-identified patent and that said Letters Patent is hereby corrected as shown below:

In the Claims

In Column 10, Line 21, insert --is-- between stretching rod and a spiral flow-

Signed and Sealed this
Twelfth Day of November, 2019

Andrei Iancu
*Director of the United States Patent and Trademark Office*